United States Patent [19]

McAllise et al.

[11] Patent Number: 4,924,039
[45] Date of Patent: May 8, 1990

[54] COOLED CORD REEL

[75] Inventors: Gregg A. McAllise, North Canton; Thomas L. Ingersoll, Boliver, both of Ohio

[73] Assignee: The Hoover Company, North Canton, Ohio

[21] Appl. No.: 307,822

[22] Filed: Feb. 8, 1989

[51] Int. Cl.⁵ ............................................... A47L 9/26
[52] U.S. Cl. .................................. 191/12.2 R; 15/323; 15/327 F; 15/413
[58] Field of Search .................... 191/12.2 R, 12.2 A, 191/12.4; 15/323, 327 F, 327 E, 327 D, 413; 242/71.8, 54 R, 118.1

[56] References Cited

U.S. PATENT DOCUMENTS

| | | | |
|---|---|---|---|
| 2,314,177 | 3/1943 | Tamarin | 15/323 |
| 2,323,275 | 6/1943 | Lofgren | 15/323 |
| 2,725,588 | 6/1943 | Dennler | 15/323 |
| 2,848,731 | 8/1958 | Tamarin | 15/323 |
| 2,959,804 | 11/1960 | Faber | 15/323 |
| 3,011,033 | 11/1961 | Belicka et al. | 15/323 |
| 4,701,974 | 10/1987 | Konig et al. | 15/323 |

FOREIGN PATENT DOCUMENTS

| | | | |
|---|---|---|---|
| 626083 | 8/1961 | Canada. | |
| 616857 | 8/1935 | Fed. Rep. of Germany | 15/323 |
| 2724249 | 11/1978 | Fed. Rep. of Germany | 15/323 |
| 1219615 | 12/1959 | France. | |
| 8800756 | 1/1988 | World Int. Prop. O. . | |

Primary Examiner—Andres Kashnikow
Assistant Examiner—Mark T. Le

[57] ABSTRACT

A cooled cord reel is provided for use with an electrical appliance. The cord reel includes a hub, a pair of cord retaining flanges mounted on the hub, a terminal block mounted in the hub and an electrical cord coiled on the hub and between the retaining flanges. Apertures are provided on the cord retaining flanges to permit cooling air flowing inwardly into the coiled cord and outwardly through it. The cord reel, additionally, has apertures in the cylindrical surface of its hub and slots through the terminal block to permit cooling air from within the hub to flow outwardly through the slots of the terminal block and the apertures of the hub.

3 Claims, 8 Drawing Sheets

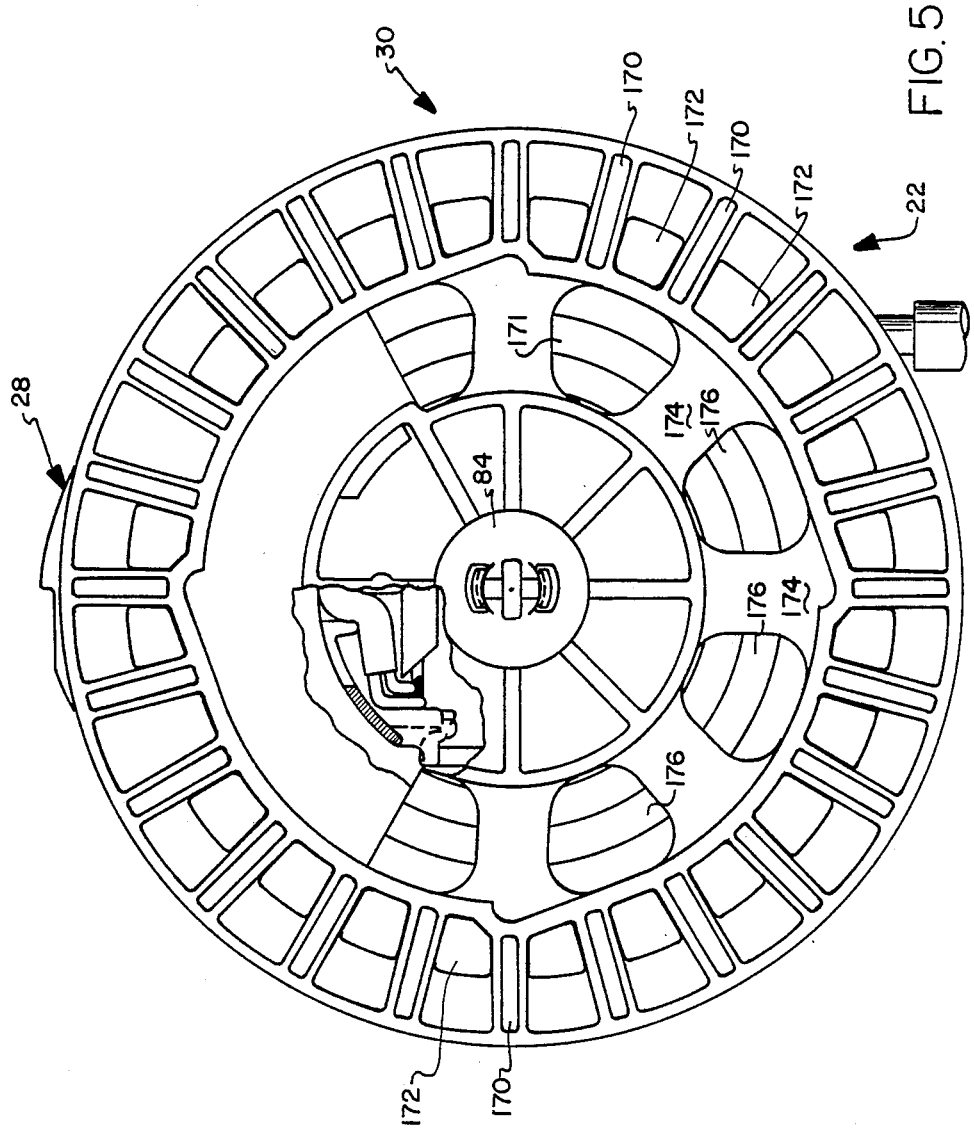

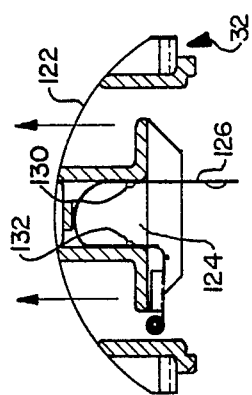
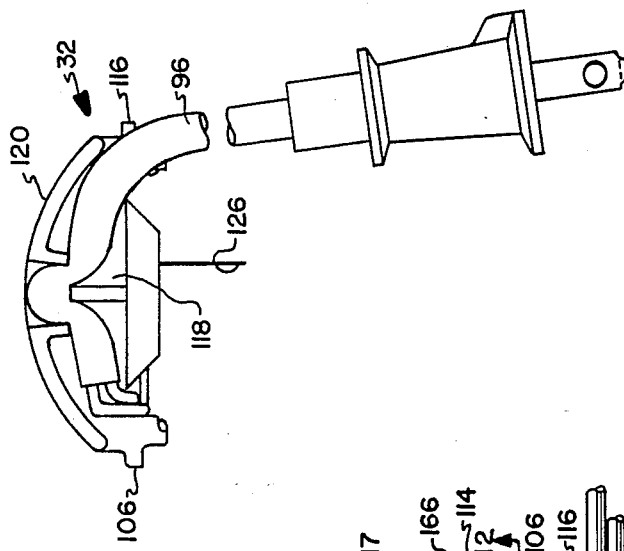
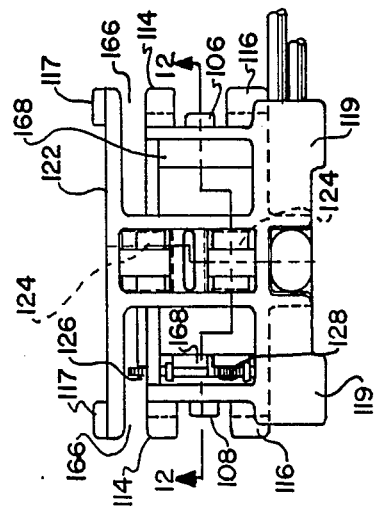

COOLED CORD REEL

BACKGROUND OF THE INVENTION

1. Field of the Invention

This invention relates to cord reels usable with electrical appliances and, more specifically, to a cooled cord reel utilized with such an appliance.

2. Summary of the Prior Art

The use of a cord reel for an electrical appliance is well known, such being used, for example, in vacuum cleaners for many years. In that configuration heat has a tendency to build up in the stored mass of wound cord and any contacts or slip or commutator rings within the reel. This has deleterious effects on these components over a period of time and, in some cases, may actually lead to significant inefficiencies in the transmission of current to the vacuum cleaner motor or an actual breakdown of the cord insulation or any surrounding plastic parts such as the reel, itself. Cooling of cord reels, in an apparent attempt to overcome these objectionable overheating tendencies, has been occasioned in the past by passing Vacuum cleaner discharge air through the flanges of the reel or directly through the hub of the reel. Cooling by these arrangements has been partially successful in maintaining cord reels and their components at a lower temperature than they would otherwise experience but additional cooling would be advisable to insure no short term or long term effect or damage to a cord reel and its parts.

Accordingly it is an object of the invention to make provision for enhanced cooling of a cord reel and its components.

It is a further object of the invention to provide for air flow through the flanges and hub of a cord reel.

It is an additional object of the invention to provide an air flow in a cord reel outwardly through its cylindrical hub wall and the coiled conductor disposed on it.

It is a still further object of the invention to provide a cooling air flow for a cord reel with improved cooling efficiency.

SUMMARY OF THE INVENTION

According to the present invention a cord reel is provided for a canister cleaner so as to be disposed downstream from the cleaner filter and fan so that it is subjected to a clean air flow to prevent clogging and fouling of it and its components.

The cord reel includes, conventionally, a wind up spring and a hand operated brake, the wind up spring taking the form of a separate drum fixed in a housing section of the reel and containing a torsion stressed wound spring band which unwinds from the drum and winds on a cylindrical boss on a reel flange when cord is played off the reel. The brake is pivoted to the same housing section and spring urged by a torsion spring against an axially extending part on this reel flange. A hand operated release mechanism selectively urges the brake in a releasing direction against the urging action of its torsion spring.

A second reel flange is spaced axially from the first by an integral hub which receives the cord in wound fashion on it. The hub and, through it, the reel are rotationally mounted in the cleaner by an integral shaft section on the housing section with the reel held on this shaft by a hooked cap that abuts the outside of the second flange and hookingly engages an integral ledge of the shaft.

A pair of commutator or slip rings are also carried by this shaft with connection wires running through the shaft to these rings. These wires are then finally connected to an outside power source, as is conventional. These commutator rings contact contacts fixed on the reel and mounted to a contact block which attaches to and forms a portion of the hub of the cord reel.

This contact block is partly cylindrical in outline on its outer surface to meld with and complete the cylindrical surface of the hub. At its circumferentially outer ends the contact block has, on each side, an outwardly extending connecting barb which engages in outwardly directed barbs at the inner sides of the reel flanges. The contact block also has a pair of locking tabs which engage through one of the flanges of the incomplete hub so that the contact block is mounted on the hub in a very secure, fixed manner to insure the operational integrity of the reel.

The contact block includes a tortuous elongated chamber for the capture of the cord mounted on the cord reel and also a series of spaced short ribs to captivatingly mount the pair of contacts which extend outwardly to engage the commutator rings. The contacts are attached to the cord reel cord also within the contact block.

The cord reel is cooled in the following manner. The flow of air through the cleaner is from the bag to the fan and through the motor to impinge on the housing section of the cord reel. It includes an open spider-like configuration which permits the flow of air through it to the first flange of the cord reel. This first flange also has a series of generally spider-like openings in it, but these openings are truncated to provide a circular band of openings on the flange at the hub connection area. Radially inwardly of this circular band, the open spider-like configuration continues until interrupted by the axially extending boss on which the cord torsion spring is wound.

Additional air also passes through a spider-like structure between the axially extending spring winding boss and a radially inwardly disposed axially extending boss which mounts the reel on the shaft of the housing section. This boss is also open so cooling air may pass inwardly of it.

Cooling air can then pass into the cord area through the outer spider-like flange configuration and into the hub area through the other openings described.

Passage of the air out of the hub occurs because the hub is generally slotted in its cylindrical area and the contact block also slotted for an outflow of cooling air through it. Air can only escape from these two areas around or through the coiled cord so cooling of it is occasioned.

The air then passes out the cleaner exhaust around the second flange although a small amount of air may pass through the spider-like structure of the second cord reel flange but this configuration is utilized primarily in an attempt to reduce the need for material.

BRIEF DESCRIPTION OF THE DRAWINGS

Reference may now be had to the accompanying Drawings for a better understanding of the invention, both as to its organization and function, with the illustration being of a preferred embodiment, but being only exemplary, and in which:

FIG. 5 is an end view of the cord reel taken generally on line 3—3 of FIG. 2;

FIG. 10 is a top plan view of the terminal block, terminals and lead wire;

FIG. 11 is a side elevational view of this structure; and

FIG. 12 is a cross sectional view of the terminal block taken on line 12—12 of FIG. 10 and showing one of its contacts.

DETAILED DESCRIPTION OF THE INVENTION

Figure 1:
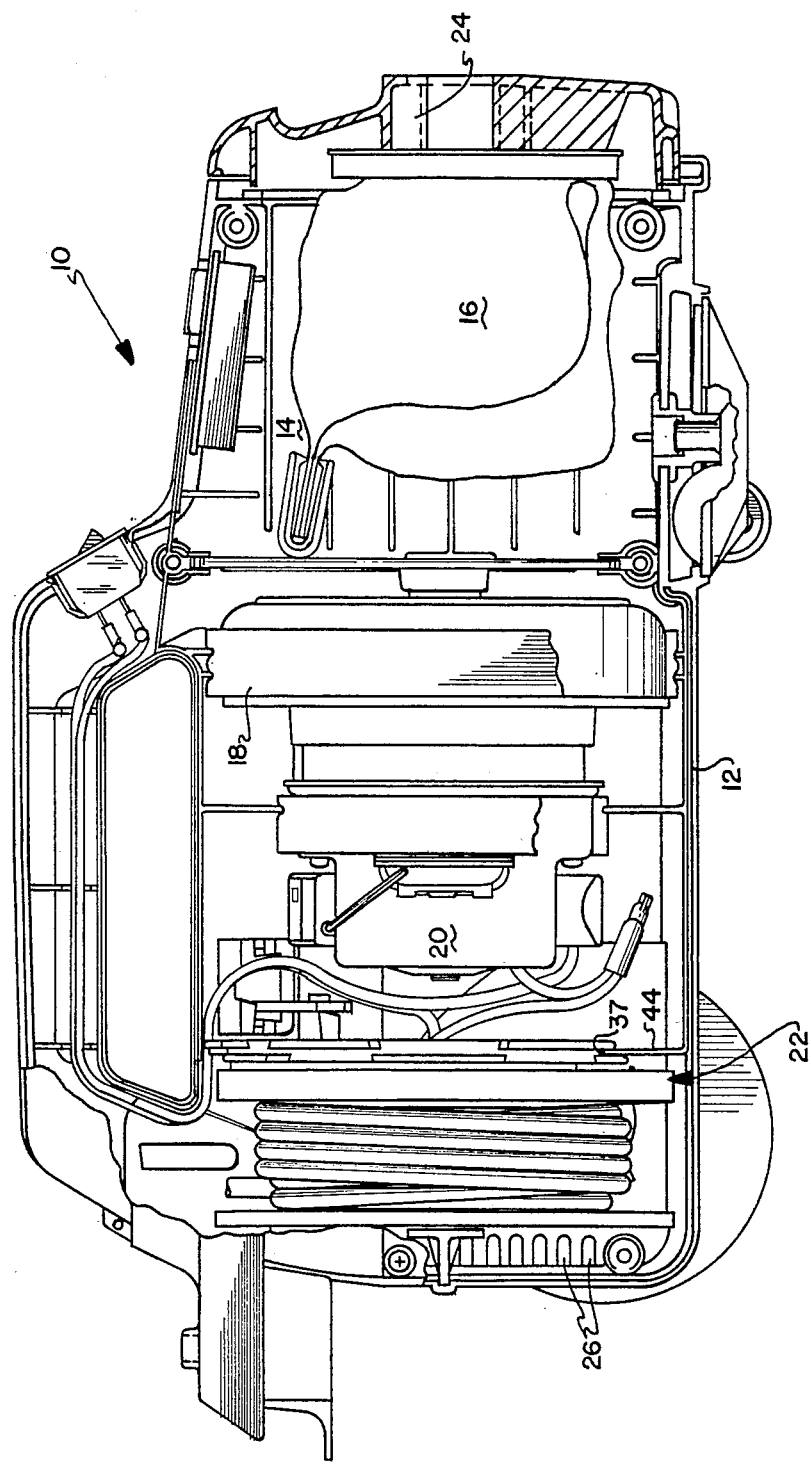
FIG. 1 is a cross sectional elevational view of a vacuum cleaner incorporating the invention.

There is shown in FIG. 1, a vacuum cleaner 10 which includes an outer shell 12 that may be split vertically to aid in assembly of its internal components. Vacuum cleaner 10 includes a bag cavity 14 in which is lodged a bag 16, a fan 18 and a driving motor 20. A cord reel assembly 22 is disposed behind the motor 20.

Air flow within the cleaner is substantially conventional. It moves through a suction opening 24, the bag 16, fan 18 and motor 20 to be discharged, essentially against the cord reel assembly. In the instant invention, it then moves through at least a portion of the cord reel assembly 22 to be discharged through discharge louvers 26, 26.

The cord reel assembly 22 is comprised of three major components; a cord reel housing section 28, a cord reel 30 and a terminal block 32. The cord reel housing section 28 is formed with a somewhat oblong shell 34 for two purposes. First, the elongated shape provides a lodgement for a cord reel return spring 36 and second it provides a non-rotatably secure mounting for the housing section 28 in a similar shaped hole 37 in vacuum cleaner 10. The cord reel housing section 28 includes an axially inwardly directed flange 38 so that it forms an inwardly opening housing and a series of radially outwardly directed axially spaced lugs 40, 42 which nest over a wall 44 surrounding the shaped hole 37.

Figure 3:
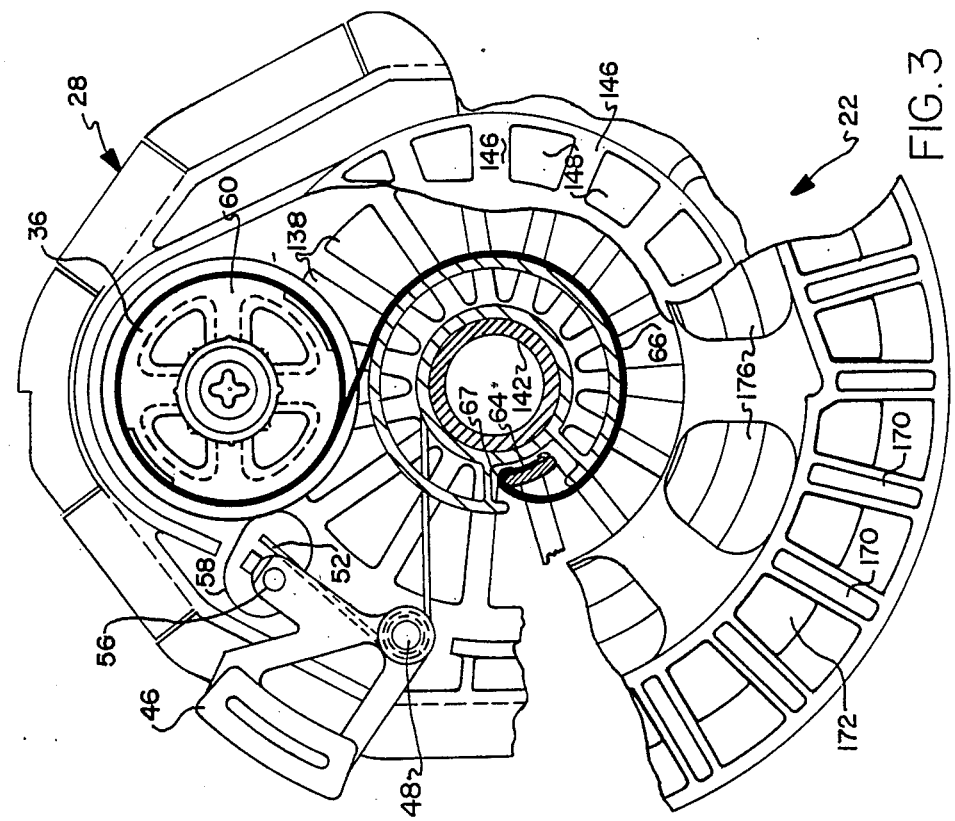
FIG. 3 is a partially cross sectioned end view with parts broken away of the cord reel taken generally on line 3—3 in FIG. 2.
Figure 2:
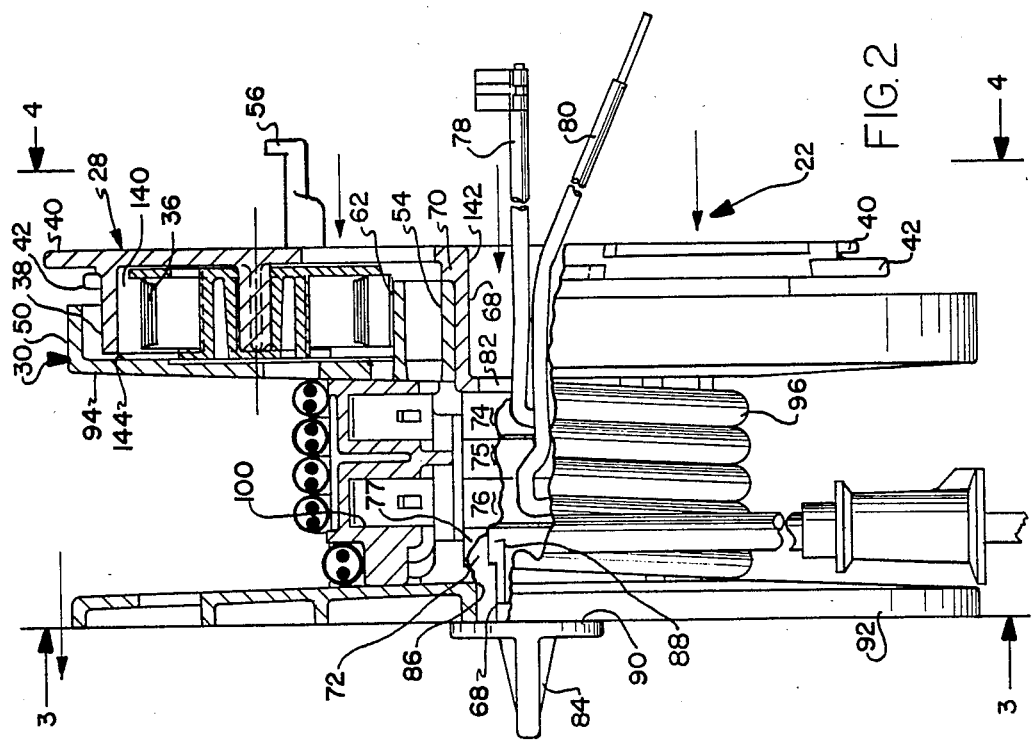
FIG. 2 is a partially cross sectioned elevational view of the cord reel of this invention.
Figure 4:
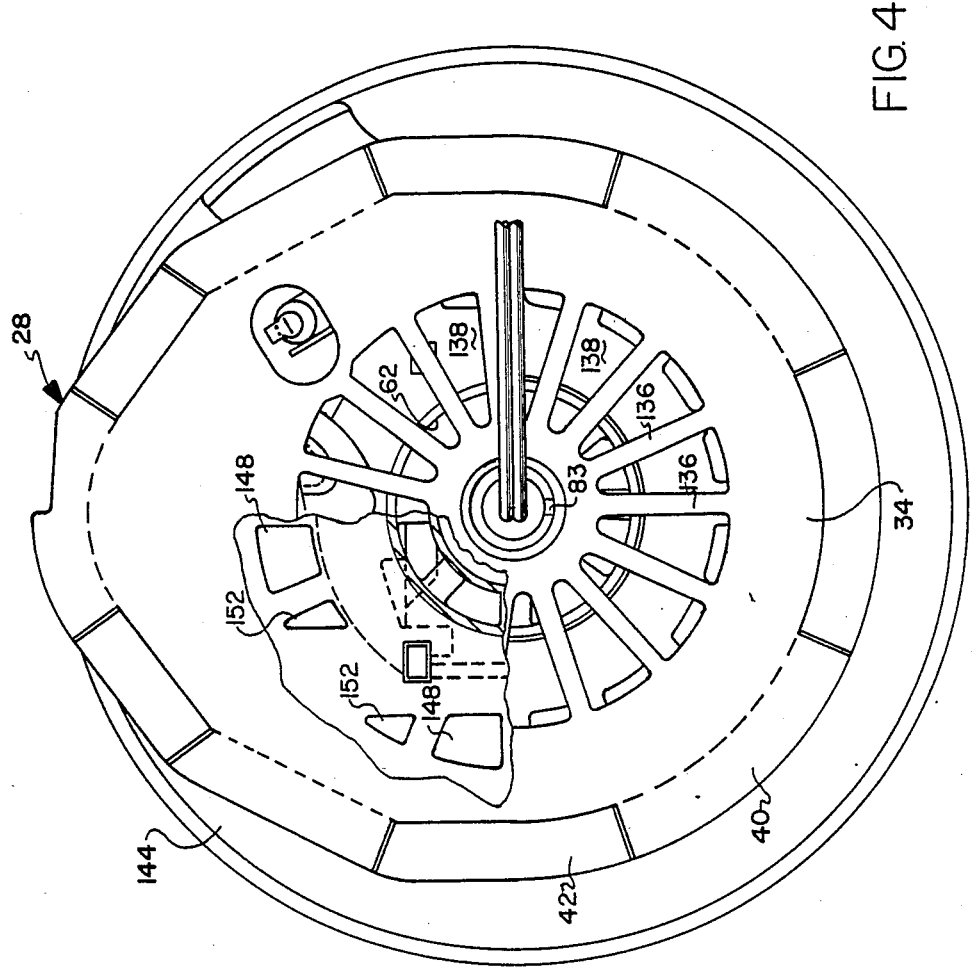
FIG. 4 is also a partially cross section end view of the cord reel taken on line 4—4 of FIG. 2 but showing the relationship between the air passages afforded in the housing section and first flange of the invention.
Figure 7:
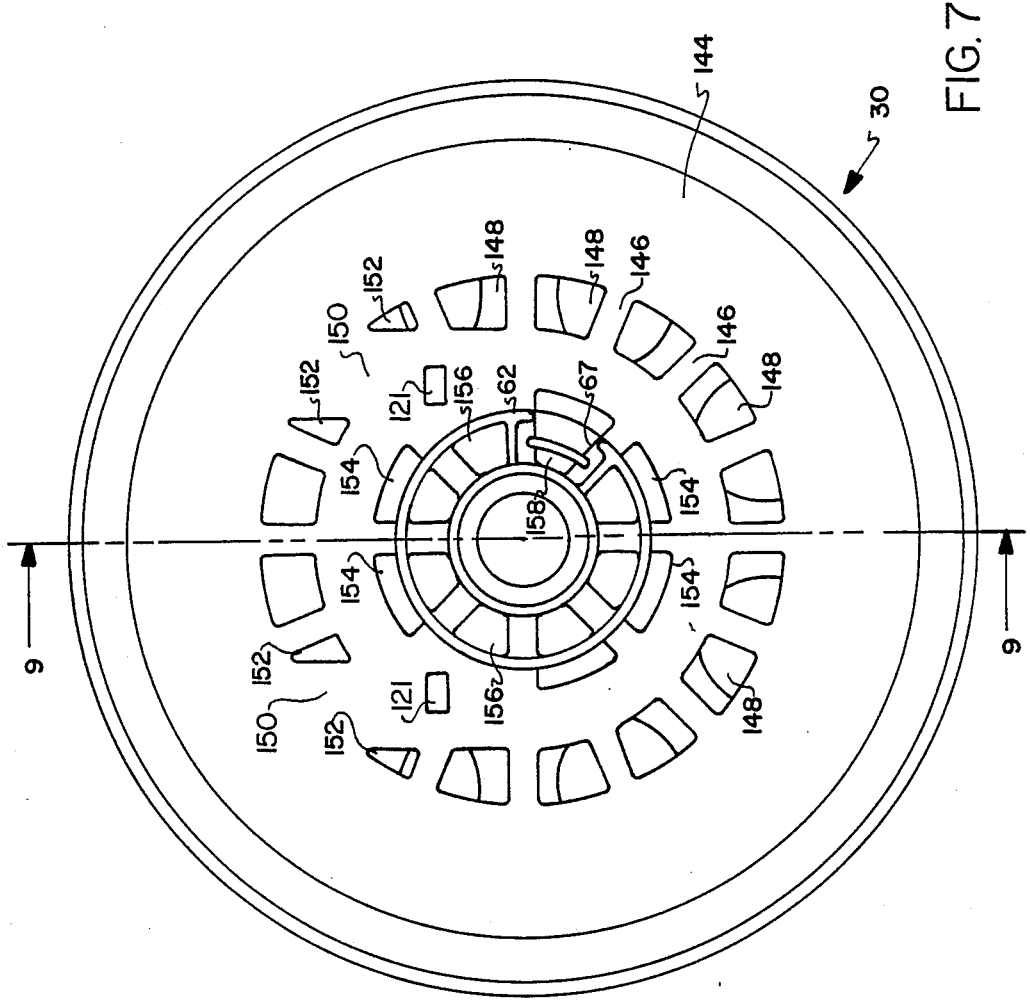
FIG. 7 is an elevational end view of the cord reel looking in the direction of line 4—4 of FIG. 2 but showing the relative disposition of all the flange cooling slotting.
Figure 6:
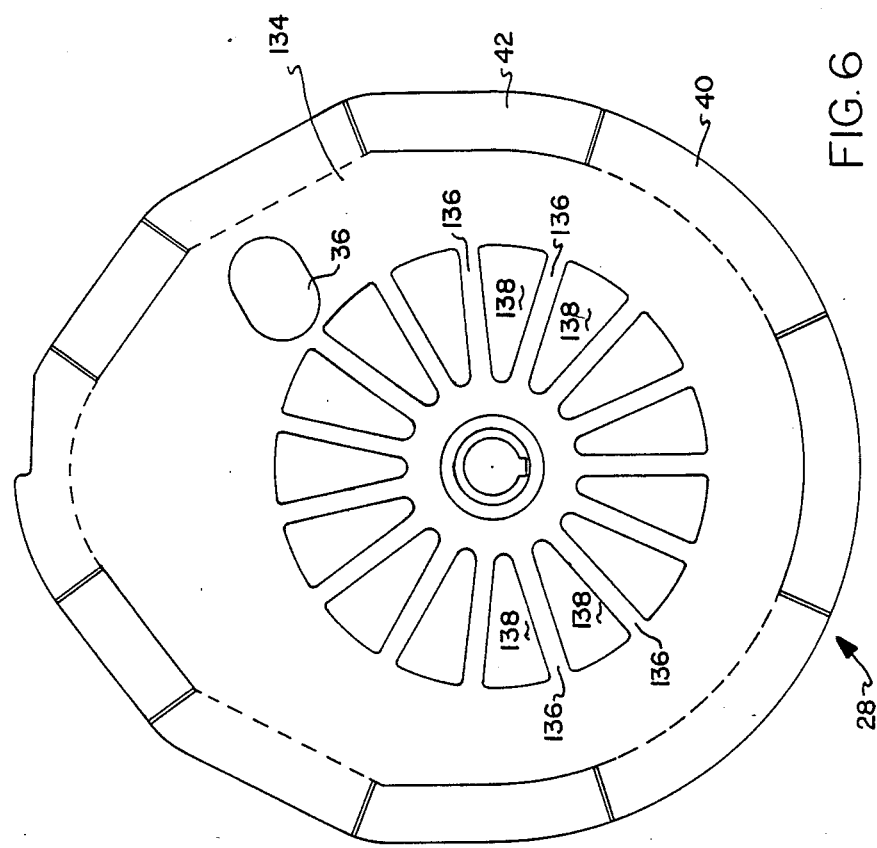
FIG. 6 is an elevational end view of the housing section looking in the direction of line 4—4 of FIG. 2 of the cord reel.
Figure 9:
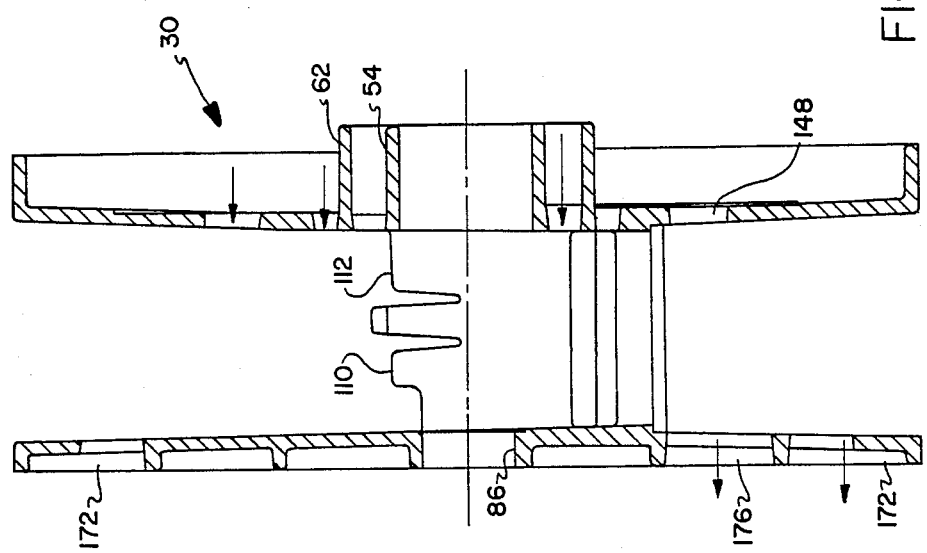
FIG. 9 is a cross sectional view taken generally on line 9—9 through the cord reel of FIG. 7.
Figure 8:
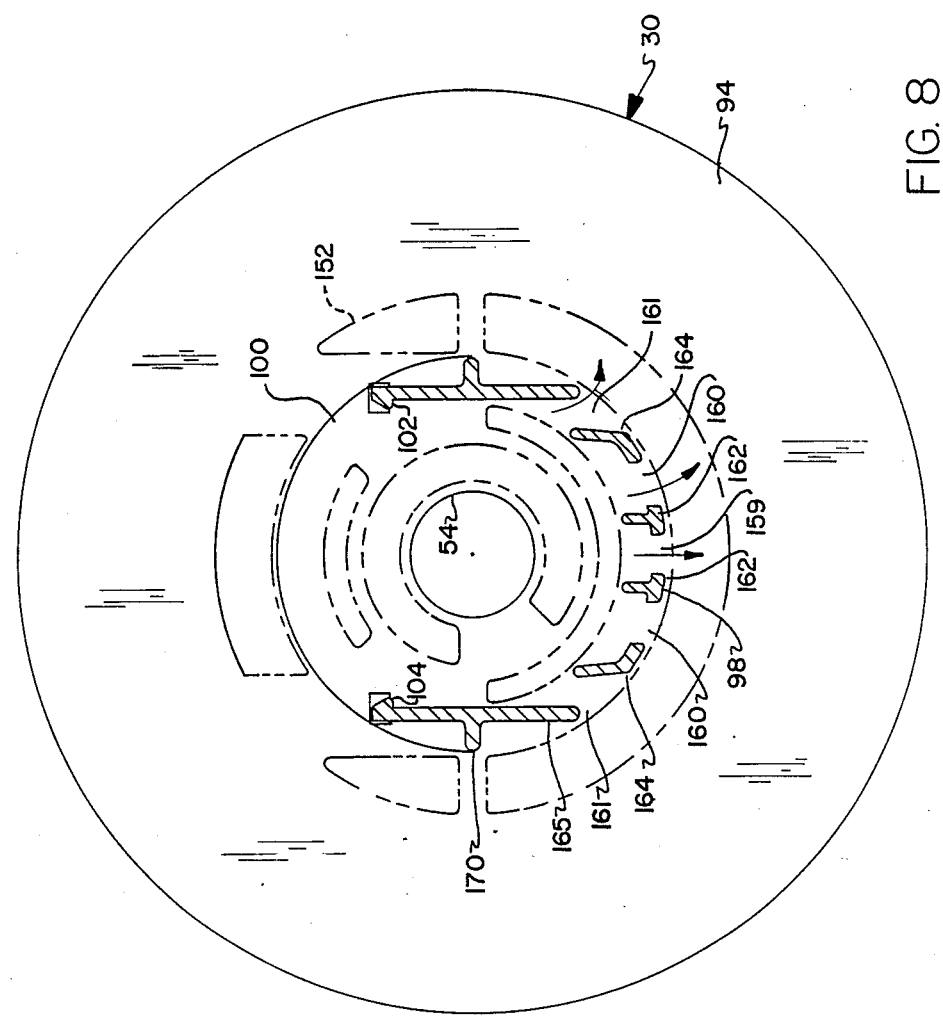
FIG. 8 is a cross sectional view generally through the center of the cord reel with the terminal block removed and showing the hub slotting.

Cord reel housing section 28 also mounts a cord reel brake 46 on a pivot pin 48 so that the same is urged into engagement with a axially outwardly extending flange 50 on cord reel 30 by a torsion spring 52. This spring acts between a stepped portion 70 of an integral projecting end 68 of cord reel housing section 28 and an axially outwardly extending projection 56 on an end of cord reel brake 46. The projection 56 extends through a hole 58 in reel housing section 28 so that the same may be contacted by a thrust link or the like (not shown) to move the brake 46 clockwise (FIG. 3) around its pivot 48 against spring 52 to release the reel 30.

The cord reel return spring 36 is a torsion spring which springingly provides a clockwise urging to cord reel 30 (FIG. 3) as it is unwound from its reel 60 and wound, as the cord reel 30 turns, on a spring winding boss 62 which is integral with and extends axially outwardly from the main portion of the cord reel 30. An end tang 64 of a spring 66 for the spring reel 60 is captured in a well 67 formed in spring winding boss 62 to insure that there is no separation between the end of the spring 66 and the spring winding boss 62.

The cord reel housing section 28 includes an integral projecting end 68 that has the stepped portion 70 and a stepped portion 72 which mount the cord reel 30 for rotation relative to it. Intermediate the stepped portions 70 and 72, a pair of commutator rings 74, 76 are mounted on the cord reel housing projecting end 68 with these rings connected to leads 78, 80, respectively that extend through a through stepped bore 82 in projecting end 68. The projecting end 68 is axially slotted by slot 83 to permit connection of the leads 78, 80 outwardly to the commutator rings 74, 76. A pair of insulating rings 75, 77 are also provided to insulate commutator rings 74, 76.

The cord reel 30 is captured on the cord reel housing section 28 by an attachment cap 84 that is inserted in an outward end 86 of bore 82 so that locking barbs 88 (only one shown) are captured behind stepped portion 72. A face 90 on the cap abuts a radially extending flange 92 on cord reel 30 to maintain the cord reel 30 on the cord reel housing section 28. A second radially extending flange 94, axially spaced from flange 92, is also provided on cord reel 30 so that cord 96 may be retained on cord reel 30 on a hub 98 between flanges 92 and 94.

Hub 98 of cord reel 30 is not continuous but open on one side at opening 100 for the reception of the terminal block 32. It includes at this open side a pair of integral, inwardly directed latches 102, 104 that engage over tabs 106, 108 in terminal block 32 to captivate this terminal block on ledges 110, 112 (only one side shown) formed on each side of the opening 100 in cord reel 30. Tabs 114, 116 of terminal block 32 rest on these ledges. The terminal block 32 is also locked into the flanges 92, 94 of the cord reel 32 by outwardly extending tabs 117 and 119 on the terminal block which deformingly engage in slots 121 and slots (not shown) disposed in these flanges.

Terminal block 32 includes a tortuous captive retention means 118 for the cord 96 and a curvilinear surface 120 outwardly of it to form a continuation of the surface of the hub 98. This surface is also continued by a narrow, curved band 122 at the opposite side of the terminal block 32. The middle portions of this terminal block also reach no further outwardly than the general curved surface of the hub. These middle portions also form a pair of wells 124, 124 for the retention of fixed contacts 126 and 128 that are connected to their individual conductors of cord 96. A pair of locking pips 130, 132 may be provided in each well to aid in fixing its respective contact 126, 128. It should be noted that the terminal block may be disposed for either left or right hand operation, that is the cord 96 may come in either end of the terminal block and the contacts reversely mounted to extend the opposite direction in it.

Cooling air moves through the cord reel housing section 28 from the motor 20 by means of an open spider-like configuration in a facing wall 134 of it. The open spider configuration is formed by a series of radially extending spaced spokes 136, 136 between which are formed openings 138, with these spaced spokes formed fully around a circle to provide easy ingress of cooling air flow to an interior 140 of the cord reel housing section 28. Air a so enters through the facing wall 34 by means of a bore 142 in stepped portion 70 of cord reel housing section 28. This air exits the bore 142 through the slot 83 provided in projecting end 68 to permit connection between the commutator rings 74, 76 and their connecting wires.

The air that flows into interior 140 of cord reel housing section 28 flows across and against a facing wall 144 of cord reel 30. This facing wall has a radially outwardly disposed truncated open spider-like arrangement formed by ribs 146, 146 between which are openings 148. These ribs do not extend completely around a circle but have two interruptions to provide blank spaces 150, 150 which provide guiding wall portions and slots 121, 121 for the insertion and retention of the terminal block 32 on this side of the reel 30. A series of four small triangular openings 152, 152, 152 and 152 complete the row of openings in which openings 148, 148 are disposed, these triangular openings fitting in the small space left on opposite sides of blank spaces 150.

An inner row of openings 154, 154 of somewhat open spider-like configuration are also provided through the face 144, with this row being generally continuous except for the area adjacent the slots 121, 121 and the boss 62. The spring winding boss 62, of course, interrupts air flow through openings 154 by an amount equivalent to the thickness of its cylindrical wall. The aperturing adjacent the slots 121, 121 is comprised of a pair of spider-like holes 156 that extend only radially outwardly to the spring boss 62. This provides for wall strengthening and an area for the slots 121, 121. A smaller opening 158 is also provided at spring well 67 to accommodate it.

The openings 148 and 152 lead air inwardly of the cord reel 28 but outwardly of its hub 98. On the other hand, the holes 154 and 156 and hole 158 lead air inwardly into the hub 98 of the cord reel 28.

Air escapes from the hub 98 through a series of axially extending, outwardly opening peripheral slot 159 and peripheral slots 160, 161 in that portion of the cord reel 30 that does not house the terminal bock 32. These slots are formed by a series of capped rib-like pieces which, at their outer extremities, form the hub 98 of the cord reel 30. These ribs are disposed equally geometrically away from the centerline drawn through the terminal block and the center of the hub 98. The two ribs 162, 162 closest to this centerline and on opposite sides of it are generally T-shaped in cross section while the next two outward ribs 164, 164 are L-shaped in cross section with the cross of the T and the outer leg of the L being slightly curved to conform to the periphery of the hub 98. Between these four ribs are the slot 159 and the two slots 160. Outwardly of the ribs 164 are disposed extended ribs 166. These ribs have ends 168 and side projections 170 in the plane of the formed hub 98. These ribs also include the latches 104 which mount the terminal block 34.

Air also passes outwardly of the hub 98 through the terminal block 32. More specifically, air passes through axially extended slots 168. 168 and arcuately extending slots 166, 166 formed in the terminal block 32 and opening inwardly to the interior of hub 98 and outward to the coiled cord 96. Each slot 168 openly communicates with its adjacent slot 166 by forming with it an open T that communicates inwardly with the interior of hub 98 and outwardly with the coiled cord 96 on the hub 98. One of the slots 168 and a portion of its adjacent slot 166 are obscured by the leads 78 and 80.

The second or other flange 92 of cord reel 32 has an outer, open spider-like configuration formed by spokes 170, 170 between which are openings 172 and an inner section 174 having openings 176, 176. Very little cooling air circulates through these openings since the cord reel 30 is open to discharge through its slotted hub and the louvers 26, 26 place the flange 92 close to ambient exhaust. However, the openings 172 and 176 save material and provide this side of the coiled cord 96 with exposure to air exhaust conditions.

The flow of cooling air in the cord reel assembly 22 should now be obvious. Fan discharge enters the open spider-like configuration of the cord reel housing section 28 through the openings 138, 138, passes through this housing and enters the cord reel 30 through openings 148, 152, 154, 156 and 158. The air is split by these openings with air through the openings 148, 152 being introduced to flow through the coiled cord 96 area outwardly of the hub 98 and the air through the openings 154, 156 and 158 entering the hub 98.

Cooling air flows out of the hub 98 through the slots 159, 160 and 161 formed in it and through the slots 166 and 168 formed in terminal block 32. Air also flows to the commutator rings 74, 76 and their contacts through slotted bore 142 of cord reel housing section 28. Air then flows largely over and around the flange 92 to be discharged from the vacuum cleaner 10 through the louvers 26.

It should be clear that the objects of the invention have been complied with by the specific embodiment described. It should also be clear that many variations of the disclosed invention could be made by one skilled in the art which would still come within the scope and purview of the invention.

What is claimed is:

1. A cooled cord reel cooled by allowing cooling air passing therethrough including;
   (a) a hub for the reception of a coiled cord,
   (b) a terminal block for connection of said coiled cord, attached to said hub,
   (c) a bore in said hub for allowing at least a portion of said cooling air passing therethrough, and
   (d) slots in said terminal block communicating with said bore for allowing at least a fraction of said portion of cooling air exhausting therethrough.

2. A cooled cord reel as set out in claim 1 wherein;
   (a) said cooled cord reel includes a relatively fixed housing,
   (b) said fixed housing having means for allowing the passing of a total cooling air flow,
   (c) only a portion of said total cooling air flows passing through said bore of said hub.

3. A cooled cord reel as set out in claim 2 wherein;
   (a) a hollow shaft is disposed in said hub,
   a portion of said total flow of cooling air passes into said shaft and exhausts through a slot disposed in said shaft.

* * * * *